United States Patent [19]

Andresen

[11] Patent Number: 4,511,234
[45] Date of Patent: Apr. 16, 1985

[54] GAIN SWITCHING AMPLIFIER
[75] Inventor: Bernhard H. Andresen, Dallas, Tex.
[73] Assignee: Texas Instruments Incorporated, Dallas, Tex.
[21] Appl. No.: 582,133
[22] Filed: Feb. 23, 1984

Related U.S. Application Data
[62] Division of Ser. No. 307,720, Oct. 2, 1981, abandoned.
[51] Int. Cl.³ ............................................. G03B 7/083
[52] U.S. Cl. ................................................. 354/428
[58] Field of Search ............... 354/427, 428, 456, 464, 354/234.1, 425, 459, 460

[56] References Cited
U.S. PATENT DOCUMENTS
3,977,011  8/1976  Matsuda ............................... 354/427
4,070,632  1/1978  Tuttle ................................. 330/144 X
4,147,991  4/1979  Ijichi et al. ........................... 330/284
4,264,163  4/1981  Hickok et al. ....................... 354/459
4,376,267  3/1983  Chu et al. ............................ 330/284
4,383,749  5/1983  Shinoda et al. .................. 354/428 X Primary Examiner—L. T. Hix
Assistant Examiner—David M. Gray
Attorney, Agent, or Firm—Richard A. Bachand; N. Rhys Merrett; Melvin Sharp

[57] ABSTRACT

A circuit for use in a temperature compensated large signal current amplifier. As utilized in one embodiment, a camera exposure control compensates film reciprocity errors with a buffer amplifier. Another embodiment of the buffer amplifier includes log compression band-gap temperature compensation.

4 Claims, 2 Drawing Figures

GAIN SWITCHING AMPLIFIER

This application is a division of application Ser. No. 307,720, filed Oct. 2, 1981, abandoned.

BACKGROUND OF THE INVENTION

Film reciprocity error is a problem inherent with most modern films, particularly the instant developing type films currently in use. The problem results in the film's lessened sensitivity to light exposure at the longer exposure times. For example, a film requiring ten millisecond exposure at a fixed shutter opening size will require 20 millisecond exposure at a lessened light intensity. At these light levels, the reciprocity error is minimal. However, going from ten milliseconds exposure to a ten-fold light level reduction requires more than ten times the length of exposure. This can be compensated by longer exposure time or by increasing the shutter size to allow the additional amount of light into the camera.

Empirical determination of reciprocity error has shown it to be of the following form:

$$T1/T0 = (AT_0)^{1/B}$$

where
- T1 = Actual shutter speed.
- T0 = Uncorrected shutter speed.
- A = Constant used to describe shutter speed at which correction starts.
- B = constant used to describe amount of correction required.

One method of compensating for reciprocity error utilizes the count-down method in which a clock generates signals while the shutter is open. These signals are counted and the shutter closure mechanism is prevented from closing if a number of repetitions is exceeded and until an additional number of clock signals are additionally counted. In the above example if the count-down trigger were set at 50 cycles wherein one repetition equals one millisecond of shutter open-time, a ten millisecond exposure would not have time added since the counting mechanism would receive only ten signals during aperature opening. However, at any time over 50 milliseconds an additional number of counts, for example five, could be added to the shutter opening time to keep the shutter open for 55 milliseconds if 50 milliseconds were set. A problem results when 100 millisecond time is set, for example, and the count-down apparatus is not completely responsive to the increased number of counts required. In this example, the device would keep the shutter open an additional five milliseconds for a total of 105 which is probably inadequate for the additional doubling of initially required reciprocity error correction. The nature of the film is such that reciprocity error is negligible below a given exposure time. Above that time, the reciprocity error increases with the length of time the shutter is open.

Accordingly, it is an object of the present invention to provide a film reciprocity error correction circuit which introduces error correction only at the lower light levels where reciprocity is a significant problem.

It is a further object of the present invention to provide a gain modifying circuit for a shutter timing mechanism which compensates for film reciprocity error under those conditions where reciprocity is a significant problem.

A yet further objective of the present invention is to provide a film reciprocity correction circuit which is temperature compensated over a wide range of temperatures to which a camera is normally exposed.

SUMMARY AND BRIEF DESCRIPTION OF THE DRAWINGS

In accordance with the present invention an amplifier gain control comprises means for maintaining a first gain for an amplifier stage over a first portion of the input signal magnitude range of said amplifier stage, and means for changing the gain of the amplifier stage including means for switching gain in the amplifier stage responsive to the magnitude of the input signal to the amplifier stage whereby the remaining portion of the input signal range is amplified at a different gain from the first gain.

This automatic gain control system comprises amplifier means, means for sensing the magnitude of an input signal to the amplifier, and means for selecting the gain of the amplifier responsive to the magnitude of the input signal.

The amplifier gain control, above, further comprises means for control of temperature induced variation in amplification characteristics.

A camera utilizing the present invention comprises a light-proof box fitted with a lens, said lens having an aperture and shutter operative to record the image of an object on a light sensitive material and having an automatic shutter timing control wherein said control comprises a voltage reference, light sensing means for determining light intensity and further translating the intensity into an electronic signal, means for amplifying the electronic signal as a logarithmic function of the magnitude of the signal, means for selecting the gain of said amplifying means responsive to the magnitude of the electronic signal, means for logarithmic decompression of the corrected signal and means for timing the shutter wherein the timing varies as a function of the magnitude of the amplified signal.

Furthermore, the above automatic shutter timing control further comprises means for control of temperature induced variation in amplification characteristics.

The method of changing the gain of a current amplifier responsive to the magnitude of the input signal to the amplifier in accordance with the present invention comprises the steps of amplifying an input signal, sensing the magnitude of the input signal to the amplifier, and selecting the gain of the amplifier responsive to the magnitude of the input signal.

A film reciprocity correction circuit for a shutter timing mechanism in a camera comprises a first differential amplifier, a first feedback circuit operatively connected to the negative terminal of the amplifier, and a second differential amplifier having a second feedback circuit operative as a voltage reference and connected to the feedback circuit of the first differential amplifier for sensing the input signal magnitude of the first amplifier and for comparing the signal to the voltage reference for the purpose of controlling the gain of the first differential amplifier. FIG. 1 is a simplified schematic diagram of a circuit constructed in accordance with the present invention.

FIG. 2 is a semi-logarithmic graph of the output characteristics of a circuit constructed in accordance with the present invention.

DETAILED DESCRIPTION OF THE PREFERRED EMBODIMENTS

Figure 1:
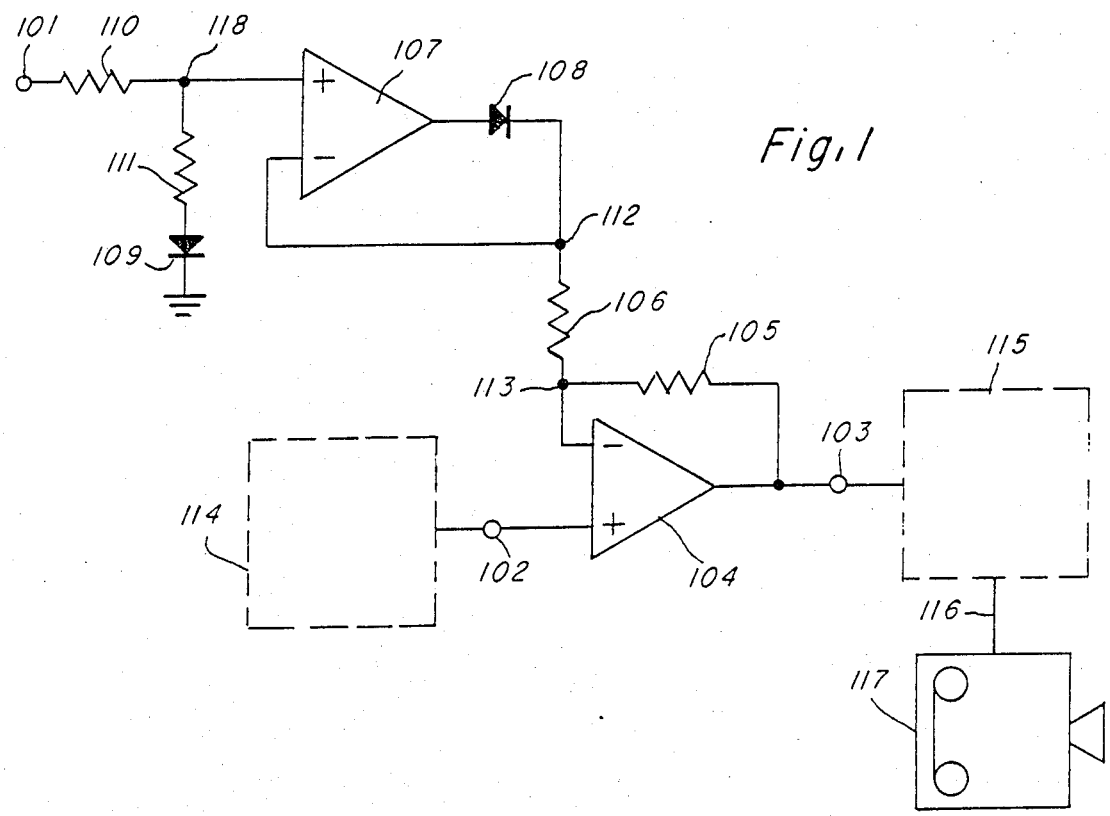

Referring now to FIG. 1, a simplified schematic drawing of the invention is shown in conjunction with a logarithmic compression amplifier 114 which normally consists of a differential amplifier having a diode on a nonlinear feedback element returning to the negative input. Amplifier 114 additionally comprises a light sensing means such as a silicon photo-diode for detecting the scene brightness level and for relating that intensity into the amplifier 114 as a current signal whose magnitude varies with the intensity of ambient light. Camera 117 comprises a light-proof box, a lens including an aperture and shutter mechanism for controlling light entry into the box. Shutter timing mechanism 115 normally comprises a means for logarithmic decompression, and an integrating capacitor and comparator means connected to the output for controlling the shutter opening time.

Amplifier 104 is a differential amplifier designed, under bright scene conditions, that is when the output from the light sensing means through amplifier 114 is a relatively high signal, amplifier 104 has a gain of 1 and operates primarily as a signal buffer between amplifier stage 114 and amplifier stage 115. The voltage reference 101 connected to the reciprocity correction circuitry is the same reference used in the other amplifier stages of the circuitry and is equal to the bandgap voltage of silicon (1.22 volts). Resistors 110 and 111 are selected to provide a voltage divider circuitry such that the voltage at 118 is selected for a "turn-on point" which operates in conjunction with differential amplifier 107 and the voltage divider network comprised of the resistors 106 and 105. When the signal at terminal 102 is relatively high no current flows through resistor divider network 105 and 106 and amplifier 104 operates at unity gain. The potential at point 112 tracks the potential at point 102 while the circuitry between point 101 and 112 is in the "off state." When the potential at point 102 becomes less than the potential at point 118, the reciprocity circuitry goes into the on state in that it begins to provide current through resistors 106 and 105. Amplifier 107 will drive current through diode 108 and maintain the voltage at point 112 equal to that at point 118. Thus, the turn-on point is selected by selecting resistors 110 and 111 to control the voltage at point 118. Prior to turning on, the buffer amplifier 104 has a gain of 1 typically. After the input voltage at point 102 has fallen below the turn-on point, the potentials between 113 and 112 are such as to draw current from reciprocity correction amplifier 107 through the feedback resistors 106 and 105 which changes the gain of amplifier 104.

The gain in the second stage of the operating range of amplifier 104 is controlled by the selection of resistors 106 and 105. In the present example these resistors will provide a gain ratio of 1.33 after the turn-on point has been reached.

The net effect in the increased gain state is that a lower signal at terminal 102 is amplified at a gain of 1.33 as it is presented to terminal 103, and thus the shutter timing circuitry at 115, typically an integrating capacitor, is provided a slightly larger signal which is designed to compensate for the reduced sensitivity of the particular film used at the lower light conditions.

Furthermore, diode 109 is included with resistors 110 and 111 in determining the voltage at point 118 so that its temperature characteristic will cancel out temperature variations in the log amp 114.

Figure 2:
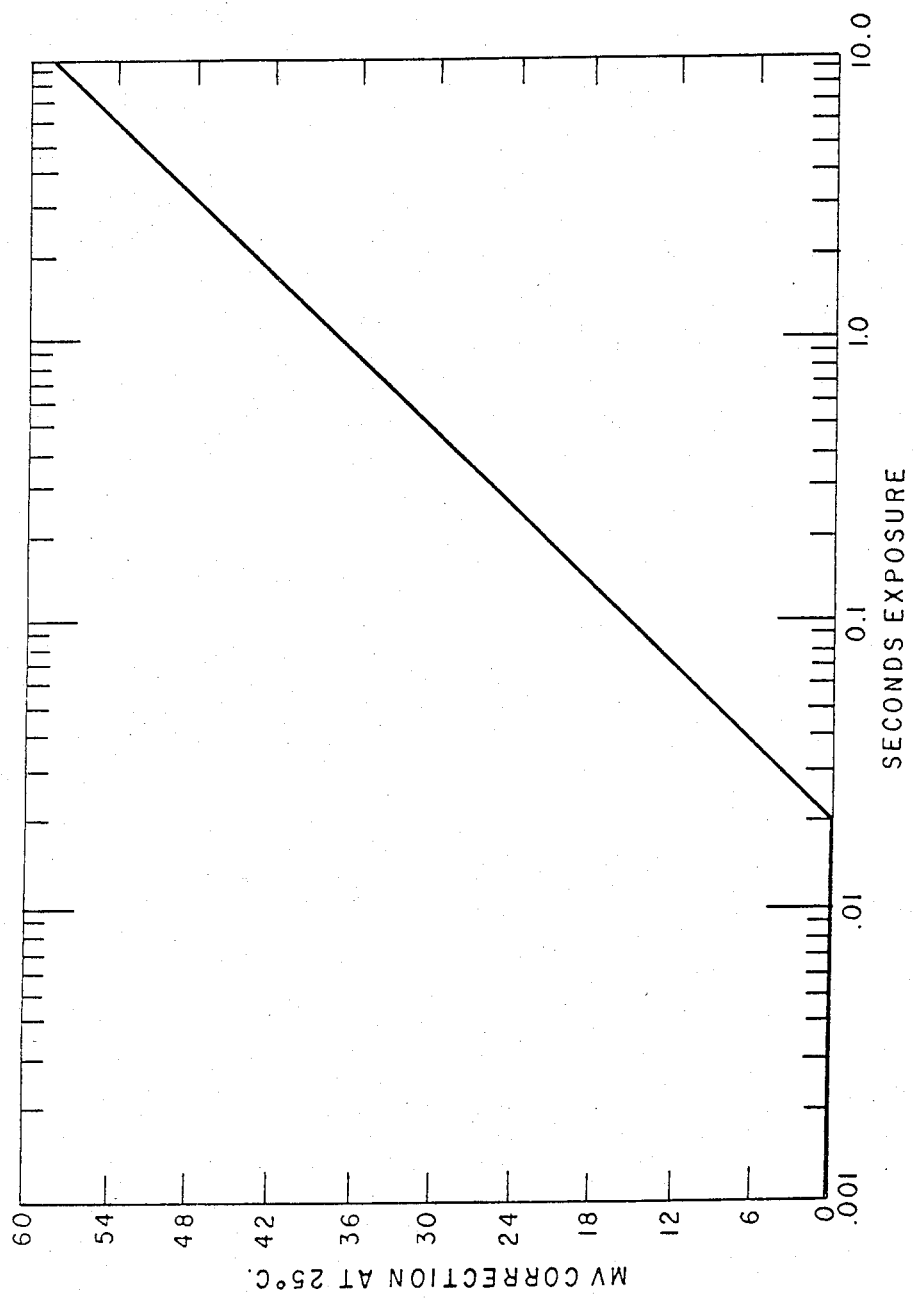

Referring now to FIG. 2, representing the logarithmic correction voltage at point 103, in accordance with the present invention wherein the turn-on point has been selected to be 20 milliseconds. The millivolt correction at 25° C. is shown on the vertical scale and the time of required exposure for the film is shown on the horizontal scale. The turn-on point at 20 milliseconds is the point at which the correction circuitry goes into the "on" state and changes the gain of the amplifier from one for the brighter conditions to a higher gain ratio, in this example 1.33, for the lower light conditions where the shutter timing control must be compensated to stay open longer to compensate for the reduced sensitivity of the film.

The disclosed invention is not limited to use in camera circuits or in correcting for film reciprocity error, but may also be used in any application requiring varying gain ratios over a range of inputs. Furthermore, the invention in one embodiment is constructed with a plurality of compensation circuits operatively connected to an amplifier for providing a multitude of gain over the entire input range of the amplifier.

Having described the invention in connection with certain specific embodiments, it is to be understood that further modifications and additional applications may now suggest themselves to those skilled in the art and is intended to cover such modifications as fall in the scope of the appended claims.

What is claimed is:

1. A film reciprocity correction circuit for a shutter timing mechanism in a camera comprising:
   (a) a first differential amplifier;
   (b) a first feedback circuit operatively connected to the negative terminal of said differential amplifier to control the shutter over a first range without reciprocity correction; and
   (c) a second differential amplifier having a second feedback circuit operative as a continuous voltage reference and connected to the feedback circuit of said first differential amplifier for sensing the input signal magnitude of said first amplifier and for comparing said signal to said voltage reference, operative to continuously increase the gain of said first differential amplifier outside said first range to compensate for reciprocity failure of the film.

2. A camera having a shutter for controlling the time light from an image to be recorded impinges a light sensitive recording material comprising:
   (a) means for translating at least a portion the light from the image into an electronic signal;
   (b) a logarithmic compression amplifier for amplifying said electronic signal as a logarithmic function of the magnitude of said signal;
   (c) a second amplifier having an input to which said signal is applied, and having a predetermined gain within a predetermined range of said signal to produce an amplified signal;
   (d) a circuit for compensating for reciprocity failure of the recording material, including means responsive to the magnitude of said signal for controlling the gain of said second amplifier outside said predetermined range;
   (e) means to which said amplified signal is applied for logarithmically decompressing said amplified signal to produce a decompresses signal; and (f) means for controlling the timing of said shutter in accordance with said decompressed signal.

3. A camera as set forth in claim 2 wherein said circuit for compensating for reciprocity failure comprises means for control of temperature induced variation in amplification characteristics.

4. The camera of claim 2 wherein said means for controlling the gain of said second amplifier comprises:

(a) a reference voltage; and
(b) a third amplifier having an input connected said reference voltage and an output connected to control said second amplifier by supplying current to said second amplifier to control the gain of said second amplifier when said predetermined range of said signal is exceeded.

* * * * *